US009339976B2

(12) United States Patent
Schneiderbauer et al.

(10) Patent No.: US 9,339,976 B2
(45) Date of Patent: May 17, 2016

(54) METHOD FOR PRODUCING A FIBER COMPOSITE COMPONENT

(75) Inventors: Gernot Schneiderbauer, Andorf (AT); Olaf Koch, Micheldorf in Oberoesterreich (AT)

(73) Assignee: FACC AG, Ried Im Innkreis (AT)

( * ) Notice: Subject to any disclaimer, the term of this patent is extended or adjusted under 35 U.S.C. 154(b) by 435 days.

(21) Appl. No.: 14/003,149

(22) PCT Filed: Mar. 1, 2012

(86) PCT No.: PCT/AT2012/000047
§ 371 (c)(1),
(2), (4) Date: Sep. 4, 2013

(87) PCT Pub. No.: WO2012/119163
PCT Pub. Date: Sep. 13, 2012

(65) Prior Publication Data
US 2014/0001682 A1   Jan. 2, 2014

(30) Foreign Application Priority Data

Mar. 4, 2011   (AT) .................................. A 295/2011

(51) Int. Cl.
| B29C 70/34 | (2006.01) |
| B29C 70/02 | (2006.01) |
| B29C 70/44 | (2006.01) |
| B29D 99/00 | (2010.01) |
| B29L 7/00  | (2006.01) |

(52) U.S. Cl.
CPC ............. *B29C 70/021* (2013.01); *B29C 70/443* (2013.01); *B29D 99/001* (2013.01); *B29L 2007/002* (2013.01)

(58) Field of Classification Search
None
See application file for complete search history.

(56) References Cited

U.S. PATENT DOCUMENTS

| 3,739,753 | A |   | 6/1973  | Burley et al. |
| 4,942,013 | A |   | 7/1990  | Palmer et al. |
| 5,601,852 | A |   | 2/1997  | Seemann |
| 5,939,013 | A | * | 8/1999  | Han ..................... B29C 70/443  264/257 |
| 6,843,953 | B2 |  | 1/2005  | Filsinger et al. |
| 7,138,028 | B2 | * | 11/2006 | Burpo ................... B29C 66/721  156/245 |
| 8,303,887 | B2 |  | 11/2012 | De Vita et al. |
| 8,455,089 | B2 |  | 6/2013  | Suzuki et al. |

(Continued)

FOREIGN PATENT DOCUMENTS

| DE | 3739753 A1 | 6/1989 |
| EP | 1181149 B1 | 12/2003 |

(Continued)

*Primary Examiner* — Edmund Lee
(74) *Attorney, Agent, or Firm* — Laurence A. Greenberg; Werner H. Stemer; Ralph E. Locher

(57) ABSTRACT

A method using a tool for producing a fiber composite component includes a planar fiber lay-up placed on a carrier mold, provided with a stiffening section protruding from the lay-up and pressed between parts of a molding tool. A chamber sealed from the mold is formed by an air-tight film enclosing the tool, the lay-up and the stiffening section. The chamber is connected to a resin supply line and a vacuum line. Resin is aspirated by negative pressure applied to the vacuum line, and the lay-up and the stiffening section are saturated by resin to form the fiber composite component. Air and resin are drawn between the parts of the tool, through the stiffening section and into a suction channel extending in the tool and connected to the vacuum line through a suction opening of the tool, for conducting air and/or resin.

16 Claims, 13 Drawing Sheets

(56) References Cited

U.S. PATENT DOCUMENTS

| | | | |
|---|---|---|---|
| 2003/0019567 A1* | 1/2003 | Burpo | B29C 66/721 156/245 |
| 2003/0090025 A1* | 5/2003 | Nelson | B29C 70/086 264/162 |
| 2004/0113315 A1* | 6/2004 | Graham | B29C 35/007 264/266 |
| 2008/0211145 A1 | 9/2008 | Graham | |
| 2010/0283180 A1* | 11/2010 | De Vita | B29C 67/0037 264/258 |
| 2011/0309547 A1* | 12/2011 | D'Acunto | B29C 33/306 264/293 |
| 2013/0069286 A1* | 3/2013 | Heim | B29C 70/443 264/571 |
| 2015/0102535 A1* | 4/2015 | Lutz | B29C 70/547 264/553 |

FOREIGN PATENT DOCUMENTS

| | | |
|---|---|---|
| EP | 2119544 A1 | 11/2009 |
| WO | 2009/060347 A2 | 5/2009 |

* cited by examiner

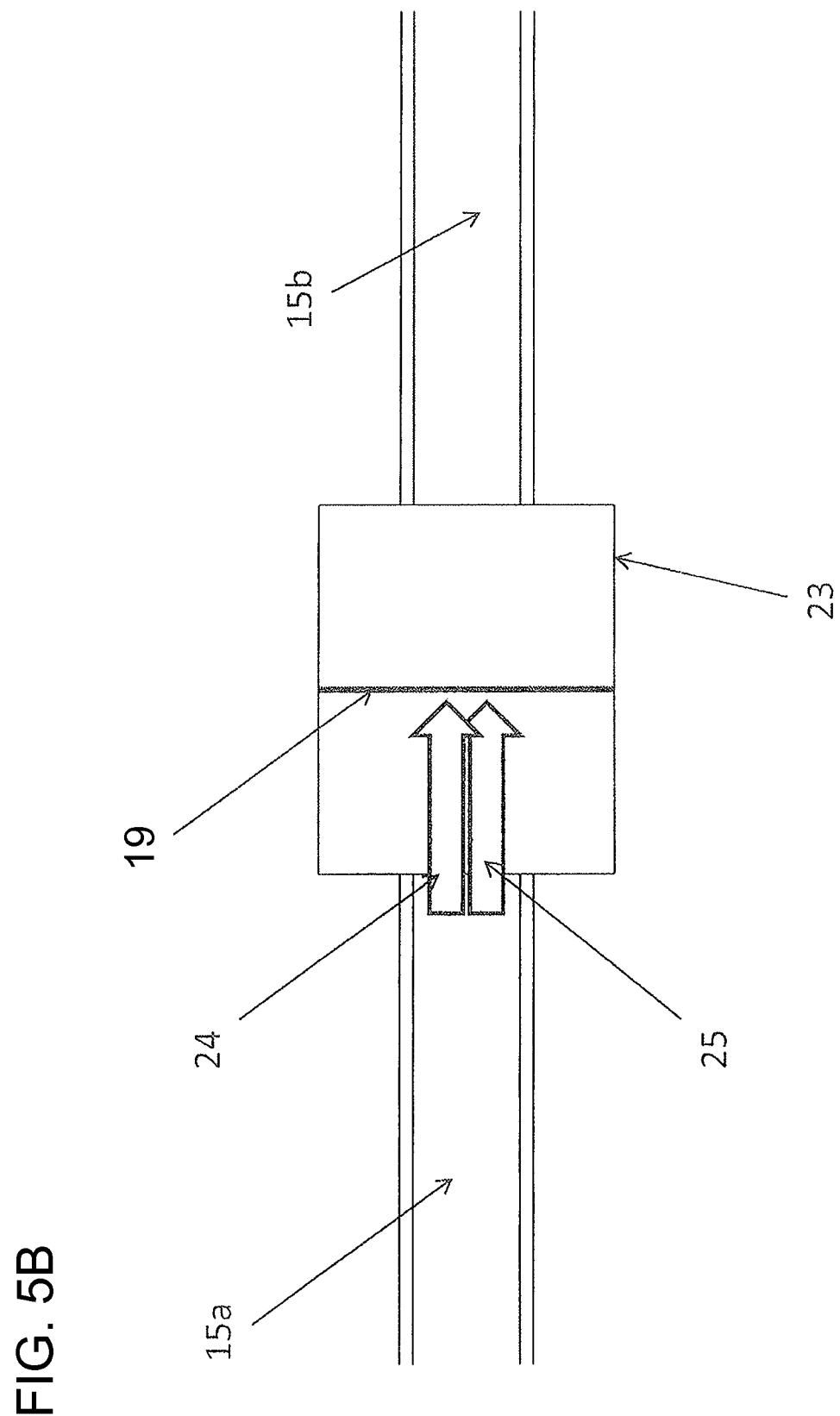

METHOD FOR PRODUCING A FIBER COMPOSITE COMPONENT

BACKGROUND OF THE INVENTION

Field of the Invention

The invention relates to a method for producing a fiber composite component, wherein a planar fiber lay-up is arranged on a carrier mold, which fiber lay-up, on a side that faces away from the carrier mold, is provided with at least one stiffening section that protrudes from the longitudinal plane of the fiber lay-up and is pressed between corresponding tool parts of a molding tool, wherein a chamber sealed relative to the carrier mold is formed by an air-tight film that encloses the molding tool and the fiber lay-up and the at least one stiffening section, respectively, which chamber is connected to at least one resin supply line and at least one vacuum line, resin being aspirated by applying a negative pressure to the vacuum line, which resin impregnates the fiber lay-up and the stiffening section, respectively, so as to form the fiber composite component.

The invention further relates to a tool arrangement for a method for producing a fiber composite component with a carrier mold for accommodating a planar fiber lay-up and a molding tool with corresponding tool parts, which, in their closed state, enclose a recess for accommodating a stiffening section for the fiber lay-up.

In the prior art, various infusion methods for producing fiber composite components are known, wherein a dry fiber material is impregnated with a matrix material which is aspirated by applying a vacuum to a sealed space. The fiber material which constitutes a pre-form or a pre-product of the complete composite component may, depending on its type, be formed by a multi-axial lay-up, a tissue or by unidirectional layers. This pre-form is arranged on a tool which defines the facing component side of the fiber composite component. On the opposite side of the composite component, a vacuum set-up is arranged which, depending on its type, comprises different films, a peel-ply and membranes.

From EP 1 181 149 B1, an injection method for producing a fiber-reinforced plastic component from a dry fiber composite preform is known, which is arranged on a tool. For forming an infusion space, the fiber composite component is covered with a semi-permeable membrane which is gas-permeable, yet prevents the passage of matrix material. Moreover, a peel-ply and a flow promoting device may be arranged. This arrangement is covered by a gas-impermeable foil which is sealed by a seal on the tool so that a second space is formed which is connected to a vacuum line. Thus, two separate spaces are used to ensure an overall deaeration of the fiber lay-up and to prevent the entry of matrix material into the vacuum line.

In EP 21 19 544 A1 and WO 2009/060347 A1, further methods for producing composite components are known, in which the fiber composite material is provided with a foil structure in the region of the molding tool so as to control the supply and removal, respectively, of the matrix material.

In U.S. Pat. No. 5,601,852, a further infusion method is described in which the composite component is produced on a solid carrier which is sealed by a special vacuum bag that forms individual supply channels.

Basically, the known methods are very well suited to produce high-quality fiber composite components, yet they meet their limits when large-area structures are to be provided with reinforcement sections. In the known methods, intricate and complex vacuum structures and film or membrane arrangements, respectively, are required in this case. In particular, this bears the risks of local leaks, tearing of the films or premature filling of the vacuum lines with matrix material. These problems are additionally aggravated if narrow tolerances are set for the geometry of the sections (location, position, thickness, height etc.).

BRIEF SUMMARY OF THE INVENTION

Thus, the present invention has as its object to provide a method of the initially defined type which is improved with regard to the problems previously discussed. Accordingly, in particular a method which is easy to be carried out is to be provided, which is well suited for producing fiber composite components with reinforcement sections even in larger numbers and with a complicated course. Moreover, a tool arrangement of simple construction to be used in such a method is to be created.

With the method of the initially defined type, this object is achieved in that air and resin are aspirated between the tool parts of the molding tool through the at least one stiffening section into a suction channel extending in the molding tool, which suction channel is connected in an air and resin-conducting manner, respectively, to the at least one vacuum line via a suction opening of the molding tool.

Accordingly, when applying a negative pressure to the sealed chamber, air and resin are aspirated between the tool parts of the molding tool through the stiffening section. After impregnation of the stiffening section, the air and resin flow, respectively, that has passed through is conducted into the suction channel in the molding tool, which channel follows upon the central recess of the molding tool. The suction channel which suitably is designed as integral cavity of the molding tool has a cross-section that is small compared to the central recess of the molding tool, the introduced air and resin flow, respectively, reaching the suction opening of the molding tool, which suction opening is connected to the vacuum device. In this way it is ensured in an advantageous manner that air and resin can get into the vacuum line only after the pre-form composed of the fiber lay-up and the stiffening section has been completely penetrated. This, in particular, makes it possible for the preform to have at least one section that is free from a semi-permeable membrane, i.e. a membrane hat is air-permeable but resin-impermeable, preferably in the region of the at least one stiffening section. Thus, the problems occurring in the prior art, especially the complicated and fault-prone arrangement of the semi-permeable membrane in the region of the stiffening elements as well as an undesired entry of resin into the vacuum line before the complete penetration of the pre-form, are reliably prevented. Thus, high-quality fiber composite components can be produced for various arrangements and configurations of the stiffening sections. In addition, the amount of rejects can be considerably reduced.

In order to ensure complete impregnation of the stiffening section at comparatively short time intervals, it is suitable if resin and air are sucked off via the suction opening at the upper side of the molding tool that faces away from the carrier mold. Accordingly, the molding tool has a suction opening on its upper side which, in particular, is formed as a cavity of the molding tool so that air and resin will get to the outer side of the molding tool via the suction channel, after having passed through the stiffening section. The suction opening is connected to the vacuum line in a suitable manner so as to maintain the suction pressure in the interior of the molding tool.

For deaerating the stiffening section, it is advantageous if within the suction channel, at least in portions thereof, air and resin are sucked off substantially perpendicular to the longitudinal plane of the fiber lay-up. In this way, resin and air can be efficiently aspirated from the fiber lay-up through the stiffening section into the suction channel and transported via the suction channel which, at least in portions thereof, extends perpendicular to the longitudinal plane of the fiber lay-up to the external suction opening of the molding tool, to which a negative pressure is applied by means of the vacuum line.

In order to prevent the resin from entering the vacuum line, it is suitable if the vacuum line comprises a membrane filter which, in its dry state, is air-permeable and resin-impermeable, which is adapted to change over into a substantially air-tight state when impregnated with resin. After the complete impregnation of the fiber pre-product, the resin gets into the vacuum line via the suction channel, which vacuum line comprises the membrane filter. When completely wetted with resin, the membrane filter closes, whereby air suction is interrupted. Thus, a self-regulating air suction is achieved. Preferably, the vacuum line, or the vacuum device connected thereto, respectively, comprises detection means which are adapted to detect a pressure change in the vacuum line. When the membrane filter changes over into its air-impermeable state after impregnation with the resin, this will cause a pressure increase in the vacuum line, which will be detected by the detection means so as to identify the complete penetration of the fiber pre-product. This arrangement of the membrane filter in the vacuum line will be particularly advantageous if the method is carried out in a closed space so that the progress of the production of the fiber composite component cannot be observed directly. Such semi-permeable membranes and membrane filters, respectively, are known in the prior art in a different context. In a preferred embodiment of the membrane filter which is also known from sports clothing, a thin silicone skin is provided which will be over-expanded during the production process such that fine pores will be created which are permeable to air, yet impermeable to a liquid, in the present instance resin. In contact with resin, the pores will gradually become closed so that the membrane will change over into its air-tight state. The silicone skin may be connected to a carrier layer in the form of a tissue.

In order to assist deaeration of the fiber pre-product, it is suitable if a further vacuum line, in particular in a rim region of the fiber lay-up, is arranged. The number of vacuum lines used will mainly depend on the dimensions of the fiber composite component as well as on the number and nature of the stiffening sections.

With a view to an easy-to-install and part-saving arrangement for producing the fiber composite component it is advantageous if the further vacuum line arranged in the rim region of the fiber lay-up is united in a common main line with the vacuum line following upon the suction channel in the molding tool. Accordingly, suction will be effected on at least two sites of the fiber pre-product, the vacuum lines being connected to the common main line which is connected to the vacuum device for producing the negative pressure.

Suitably, in a region free from the molding tool, in particular in a rim region of the fiber composite component, a membrane or tissue structure is arranged which has a distributing membrane and/or a peel-ply. Basically, such a membrane or tissue structure is known in the prior art. Yet, sucking off air and resin at the molding tool makes it possible to do without a semi-permeable membrane for separating an infusion space from a deaeration space, or to employ such a semi-permeable membrane exclusively in the rim region of the fiber composite component, whereas the remaining regions of the fiber composite component can be free from the semi-permeable membrane.

For forming an air-tight, closed infusion space inside of the air-tight film, it is suitable if in the rim region of the fiber lay-up, the distributing membrane is sealed relative to the carrier mold.

For carrying out the method, it is suitably provided that the aspiration of resin is carried out in a furnace under the supply of heat. If the method is carried out in a furnace, it will not be possible to simply determine whether or not the impregnation of the fiber lay-up has been completed. As described before, it is, therefore, of particular advantage if a semi-permeable membrane filter is arranged in the vacuum line, which filter will change over into a closed, air-tight state when in contact with a resin. Thus, when the fiber lay-up and the stiffening section, respectively, have been completely impregnated, air suction will be automatically interrupted as soon as the resin reaches the membrane filter in the vacuum line.

In addition, the basic object of the invention is achieved by a tool arrangement of the initially defined type, in which the molding tool has a suction channel connected to the recess for receiving the stiffening section, which suction channel is connectable to a vacuum line for sucking-off air via a suction opening formed on the molding tool. In the prior art, molding tools to be used in an infusion method are known in various embodiments. The molding tool comprises at least two cooperating tool parts which enclose a central recess for pressing a correspondingly shaped stiffening section accommodated therein. In addition, the molding tool comprises at least one suction channel designed as a cavity of at least one tool part of the molding tool. The suction channel connects the recess for the stiffening section with the suction opening which can be connected to the vacuum device. The effects and advantages, respectively, thereby achieved substantially correspond to those in the method explained above, so that reference can be made to these passages in order to avoid repetitions.

For improving the suction of air and resin through the molding tool, it is preferably provided for the suction opening to be designed as a cavity of the molding tool at the upper side of the molding tool which faces away from the carrier mold. In the operating position of the molding tool, the longitudinal axis of the suction channel preferably is arranged substantially perpendicular to the longitudinal plane of the carrier mold.

According to a preferred embodiment, the molding tool has a recess of substantially rectangular cross-section in its closed state for pressing a web-shaped part of the stiffening section. For forming a stringer element, in particular a T-shaped stiffening section may be provided which, e.g. in a wing of an aero-plane, reinforces a large-area wing structure produced from a planar fiber lay-up.

Of course, also other configurations of the molding tool which, by themselves, are known in the prior art may be provided in order to provide appropriate stiffening sections. Accordingly, in an alternative preferred embodiment it is provided for the molding tool to have a recess of substantially L-shaped cross-section in its closed state, for pressing a correspondingly shaped part of the stiffening section. In this way, in particular a so-called LZ stiffening section can be produced.

In a preferred embodiment it is provided for at least two molding tools to be provided for pressing one stiffening section each, at least one spacer block being arranged therebetween which comprises a resin supply channel connectable to the resin supply line. On the one hand, the spacer is adapted to fix adjacent molding tools in their intended positions; moreover, the resin supply may be effected through the spacers, wherein the resin is introduced in the region of the fiber lay-up into the sealed chamber via the resin supply channel.

For supplying the resin it is suitable if the resin supply channel of the spacer block comprises a portion extending substantially perpendicular to the longitudinal plane of the fiber lay-up, which portion is connectable to the resin supply-line, and a portion extending substantially in parallel to the longitudinal plane of the fiber-lay-up for introducing resin. Thus, the introduction of the resin occurs tangentially or in parallel to the longitudinal plane of the fiber lay-up, whereby a suitable impregnation of the fiber lay-up can be achieved.

BRIEF DESCRIPTION OF THE SEVERAL VIEWS OF THE DRAWING

In the following, the invention will be further explained by way of exemplary embodiments illustrated in the drawings without, however, being restricted to the same. In detail, in the drawings

FIGS. 5a and 5b each show a schematic view of the vacuum line comprising a membrane filter which, in its dry state (cf. FIG. 5a), is air-permeable and resin-impermeable and which, when impregnated by resin, changes over into a substantially air-tight state (cf. FIG. 5b);

DESCRIPTION OF THE INVENTION

Figure 1:
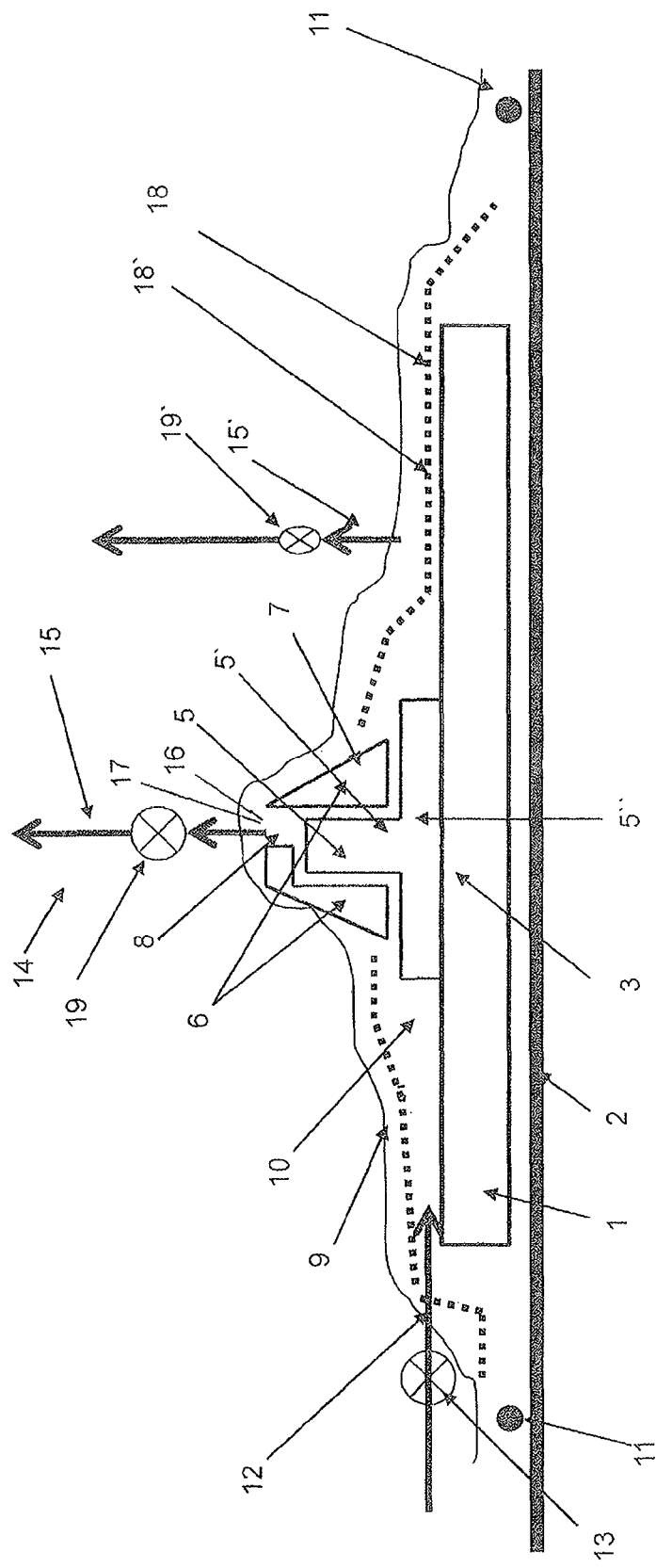
FIG. 1 shows a schematic sectional view through a structure for producing a fiber composite component in an infusion method according to one embodiment of the invention, wherein an air and resin flow, respectively, is sucked through a T-shaped stiffening section in a molding tool which comprises a suction channel connected to at least one vacuum line.
Figure 2:
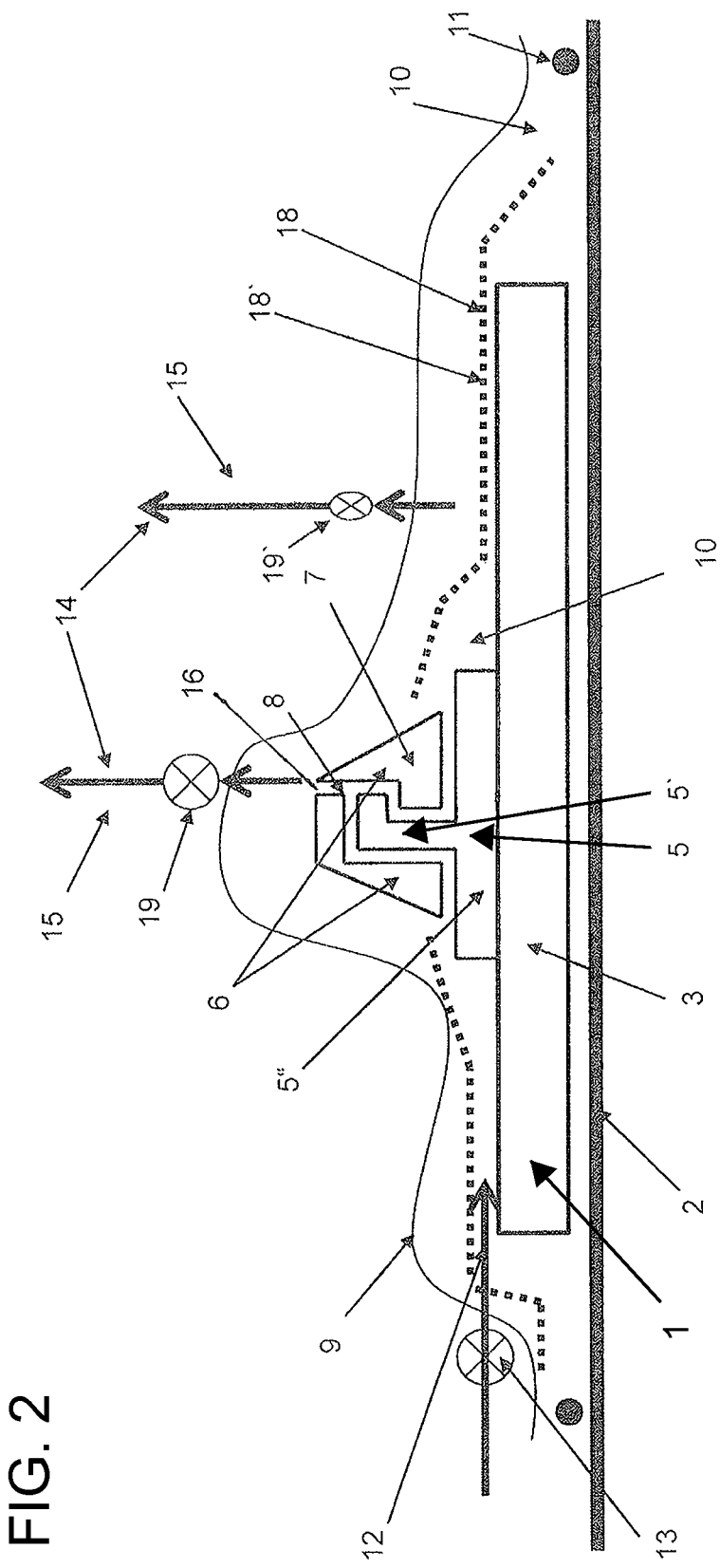
FIG. 2 shows a sectional view corresponding to FIG. 1 of a structure for producing a fiber composite component, wherein according to a further embodiment of the invention an LZ-stiffening section is provided.

In each one of FIGS. 1 and 2, a structure for producing a fiber composite component 1 in the infusion method is illustrated, wherein a planar fiber lay-up 3, in particular of carbon fibers, is arranged on a carrier mold 2 merely schematically illustrated, which fiber lay-up forms, e.g., a covering field. On a side of the fiber composite component 1 facing away from the carrier mold 2, at least one stiffening section 5 is arranged which protrudes from the longitudinal plane of the fiber lay-up 3. At the onset, the fiber lay-up 3 and the stiffening section 5 are present as dry fiber pre-product or as pre-form which is impregnated with resin so as to form the fiber composite component 1. According to the embodiment illustrated in FIG. 1, the stiffening section 5 has a web- or stringer-shaped part 5' and a part 5" resting on the fiber lay-up 3 which together form a T-shaped fiber composite component 5.

The web or stringer-shaped part 5' of the stiffening section 5 is compressed between corresponding tool parts 6 of a molding tool 7. For this purpose, the molding tool 7 has a recess 8 corresponding to the stiffening section 5 in which the stiffening section 5 is accommodated (for a better overview, in the schematic FIGS. 1 to 3, the molding tool 7 is shown spaced from the stiffening section 5; during compression, however, the molding tool 7 will, of course, contact the stiffening section, cf. FIGS. 7 to 11). In the exemplary embodiment illustrated, wedge-shaped blocks are provided as tool parts 5 which, however, may also have a different shape. For producing the fiber composite component 1 in the infusion method, a chamber 10 sealed relative to the carrier mold 2 is formed by means of at least one air-tight film 9 (also termed vacuum bag) enclosing the fiber lay-up 3 and the stiffening section 5. For this purpose, (schematically illustrated) seals 11 are provided on opposite sides of the tool arrangement. Chamber 10 is connected to at least one resin supply line 12 (schematically illustrated by an arrow) which may comprise a (shut-off) valve 13. The resin supply line 12 is connected to a resin reservoir (not illustrated). Moreover, the structure comprises a vacuum device 14 which includes at least one vacuum line 15 leading out of the chamber 10, which will be connected to a corresponding vacuum machine (not illustrated) for producing a negative pressure. By applying a negative pressure, resin is aspirated through the resin supply line 12 into the chamber 10. The aspirated resin is sucked through the fiber lay-up 3 and through the stiffening section 5, respectively, so as to impregnate the fiber lay-up 3 and the stiffening section 5, respectively, with resin for forming the fiber composite component 1.

In known methods of this type it has proven to be difficult to separate impregnating the pre-form with matrix material from sucking off the air. For this purpose, in most cases a semi-permeable, i.e. air-permeable yet matrix material-impermeable, film extending at least on one side about the tool arrangement has been used so as to separate an infusion space connected to the resin supply from a deaerating space connected to the vacuum line. Yet, particularly in case of large-area structures which are provided with complicated stiffening elements, this has proven to be complex and fault-prone.

On the other hand, in the embodiment illustrated, air and resin are sucked between the tool parts 6 of the molding tool 7 through the stiffening section 5 into a suction channel 16 formed in the molding tool 7 (cf. FIG. 3 and FIG. 7), which suction channel follows upon the recess 8 between the tool parts 6 of the molding tool 7 at the side of the stiffening section 5 facing away from the carrier mold 2. The suction channel 16 is in air- and resin-conducting connection with the vacuum line 15 via a suction opening 17 formed on the upper side of the molding tool 7. Moreover, in FIG. 2 a further vacuum line 15' can be seen which is arranged to assist the vacuum line 15 in a rim region of the fiber lay-up 3. The vacuum line 15' can be united in a common main line (not illustrated) with the vacuum line 15 following upon the suction channel 16 in the molding tool 7, the main line being connected to a common vacuum machine (not illustrated).

As is further apparent from FIGS. 1 and 2, a membrane or tissue structure 18, respectively, is provided in a region free from the molding tool 7, which structure includes at least one flow aid or distributing membrane 18', respectively, which may, e.g., be fixed by an adhesive tape. Moreover, below the distributing membrane 18', a peel-ply may be provided which is directly applied to the component surface. The distributing membrane 18' serves to distribute the aspirated resin on the component surface. The peel ply facilitates peeling off the matrix-material-impregnated distributing membrane 18' after the fiber composite component 1 has been completed. In the embodiment illustrated it is, however, not necessary to put a semi-permeable membrane over the entire structure so as to separate an infusion space from a venting space.

As is furthermore schematically visible from FIG. 1 and FIG. 2, one membrane filter 19 and 19' each, respectively, is arranged in the vacuum lines 15, 15', each of which filters is adapted to change over into a substantially air-tight condition when it has been impregnated with resin. The arrangement of the membrane filters 19, 19', the function of which will be described in more detail in connection with FIGS. 5a, 5b allows for an advantageous self-regulation of the infusion method by stopping the air suction via the vacuum lines 15, 15' as soon as the resin discharged from the suction channel 16 reaches the respective membrane filter 19, 19' via the vacuum line 15, 15'.

From FIG. 2, an alternative embodiment of the stiffening section 5 is visible which comprises an L-shaped part 5' following upon a part 5" offset from the planar fiber lay-up 3 in a step-like manner so that an LZ-section is obtained. The recess 8 between the tool parts 6 is accordingly L-shaped.

Figure 3:
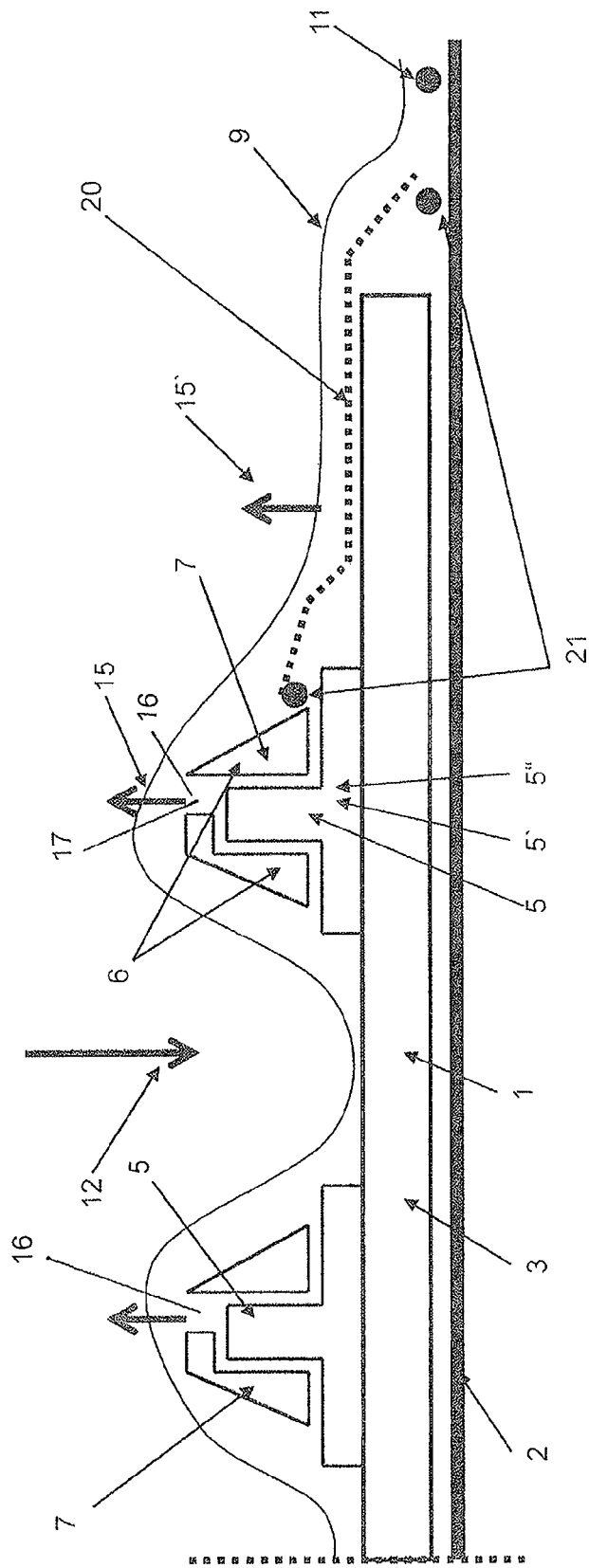
FIG. 3 shows a schematic sectional view through a structure according to the invention for producing a fiber composite component, wherein an air-permeable and resin-impermeable membrane is arranged in a rim region of the fiber composite component.

From FIG. 3, particularly the rim region of the structure is visible. Accordingly, in the rim region of the fiber composite component 1, a semi-permeable, i.e. air-permeable and resin-impermeable, membrane 20 is arranged which is sealed relative to the molding tool 7 and the carrier mold 2, respectively, by means of seals 21. By this, a premature entry of the resin into the vacuum line 15' is prevented. The remaining portions of the fiber composite component 1, especially in the region of the stiffening sections 5 and in regions between adjacent stiffening sections 5, may, however, remain free from such a semi-permeable membrane; in these regions, a premature entry of resin into the vacuum line 15 is prevented by the arrangement of the suction channel 16 in the molding tool 7 previously explained.

Figure 4:
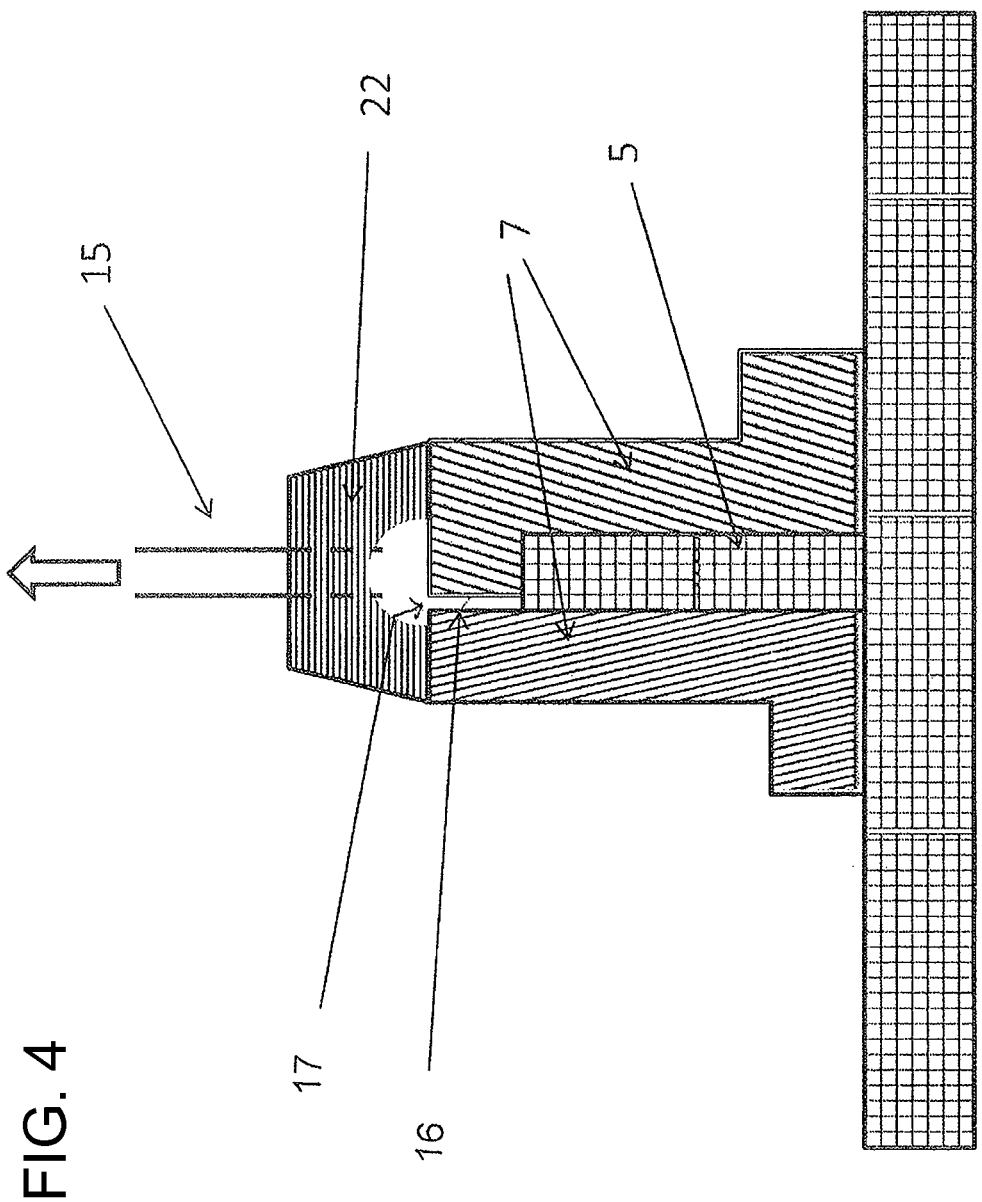
FIG. 4 schematically shows a section through the tool arrangement in the region of the suction channel, wherein a connecting part has been put onto the upper side of the molding tool, which upper side comprises the suction opening of the suction channel, and the vacuum line will be connected to said connection part.

FIG. 4 shows a sectional view of the structure in the region of the molding tool 7, wherein the suction channel 16 following upon the recess 8 above the stiffening section 5 can be seen, which is connected to a connection part 22 (e.g. a silicone section) via the suction opening 17. The connection part 22 preferably extends over the entire length of the stiffening section 5. Preferably, each stiffening section 5 has its own connecting part 22 for connection to the vacuum device 14. As schematically visible in FIG. 4, the connecting part 22 is connected to the vacuum line 15 which comprises the membrane filter 19. The connecting part 22 may comprise separating walls (not illustrated) spaced apart in longitudinal direction, which subdivide the inner space of the connecting part 22 into individual chambers which, preferably, are each connected to a suction channel 16 of the molding tool 7. After having passed through the stiffening section 5, air and resin flow into the connecting part 22 via the suction channel 16, and from there they flow into the vacuum line 15. When the resin gets to the membrane filter 19 via the vacuum line 15, the membrane filter is converted into its air-tight state so that air suction is interrupted. The pressure drop at the vacuum line 15 can be detected by detection means (not illustrated) so as to determine the end of the infusion process. This is particularly advantageous if a direct observation of the production process is not possible, which will particularly be the case if the method is carried out in a furnace under supply of heat.

Figure 5A:
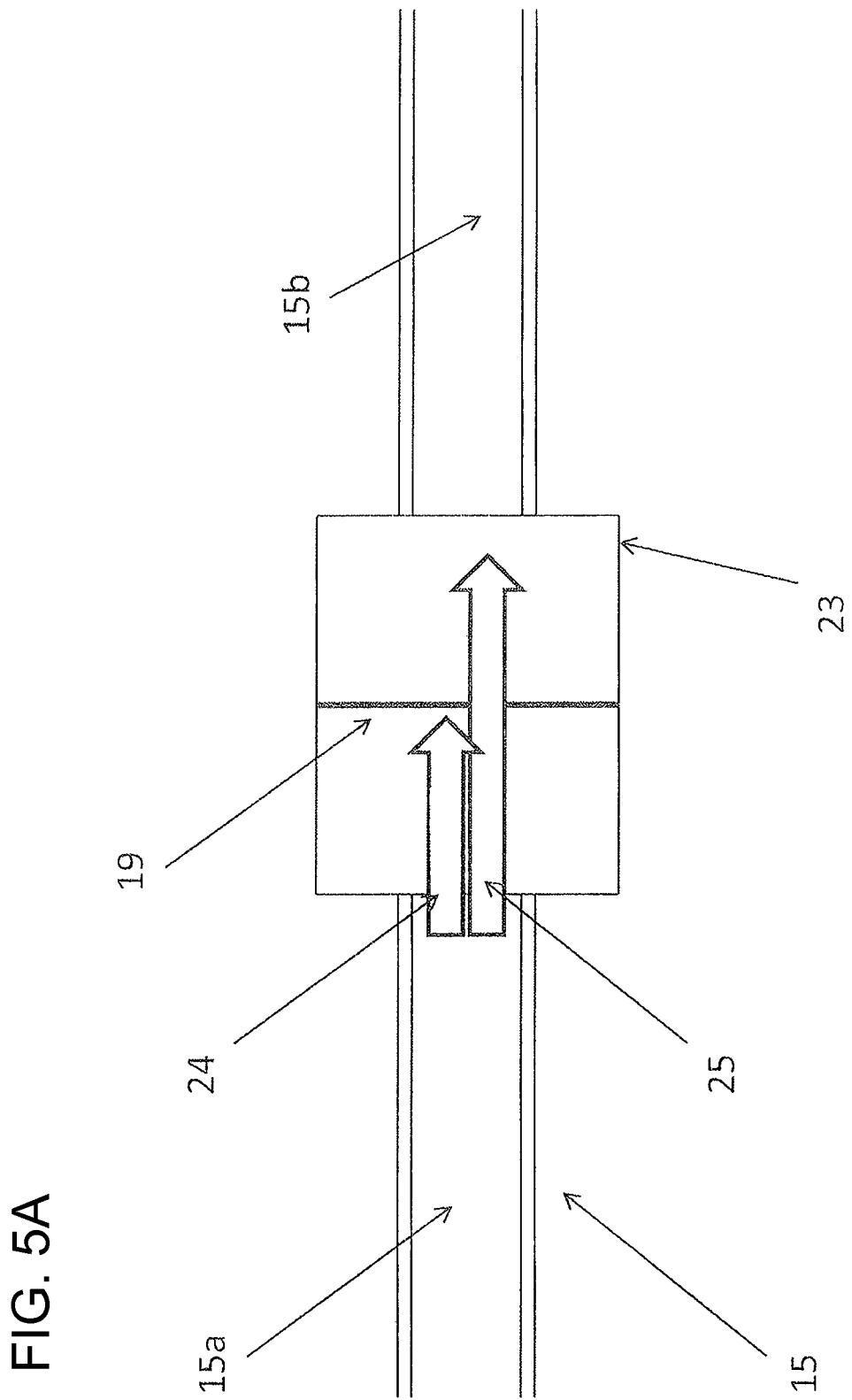

From FIGS. 5a and 5b the function of the membrane filter 19 is schematically visible; membrane filter 19' is designed in like manner. Accordingly, the vacuum line 15 has a portion 16a connected to the chamber 10, especially to the connecting part 22 arranged therein, which portion 15a is connected to a portion 15b via a connecting part 23 that is connected to the vacuum machine. The membrane filter 19 is arranged in the connecting part 23. In its open state illustrated in FIG. 5a, the membrane filter 19 is permeable for a resin flow illustrated by an arrow 24 and for an air flow illustrated by an arrow 25. For this purpose, the membrane filter 29 may comprise fine pores which are generated in the production of the membrane filter 19, 19' e.g. by overexpanding a thin silicone film. When wetting with resin, the membrane filter 19, 19' will remain air-permeable until the membrane filter 19, 19' has been completely soaked, whereby its air permeability gets lost. Thus, the membrane filter 19, 19' at first causes a flow-restricting effect, when the pores gradually become closed by contact with the resin, before the membrane filter 19, 19'—in its air-impermeable state—assumes the function of a matrix blocker analogous to a self-regulating valve. Thus, in the air-tight state illustrated in FIG. 5b, both a resin passage (arrow 24) and an air passage (arrow 25) into portion 15b of the vacuum line 15 are prevented.

In FIGS. 6 to 11, various views of the tool arrangement to be used in the previously described infusion method are shown.

Figure 6:
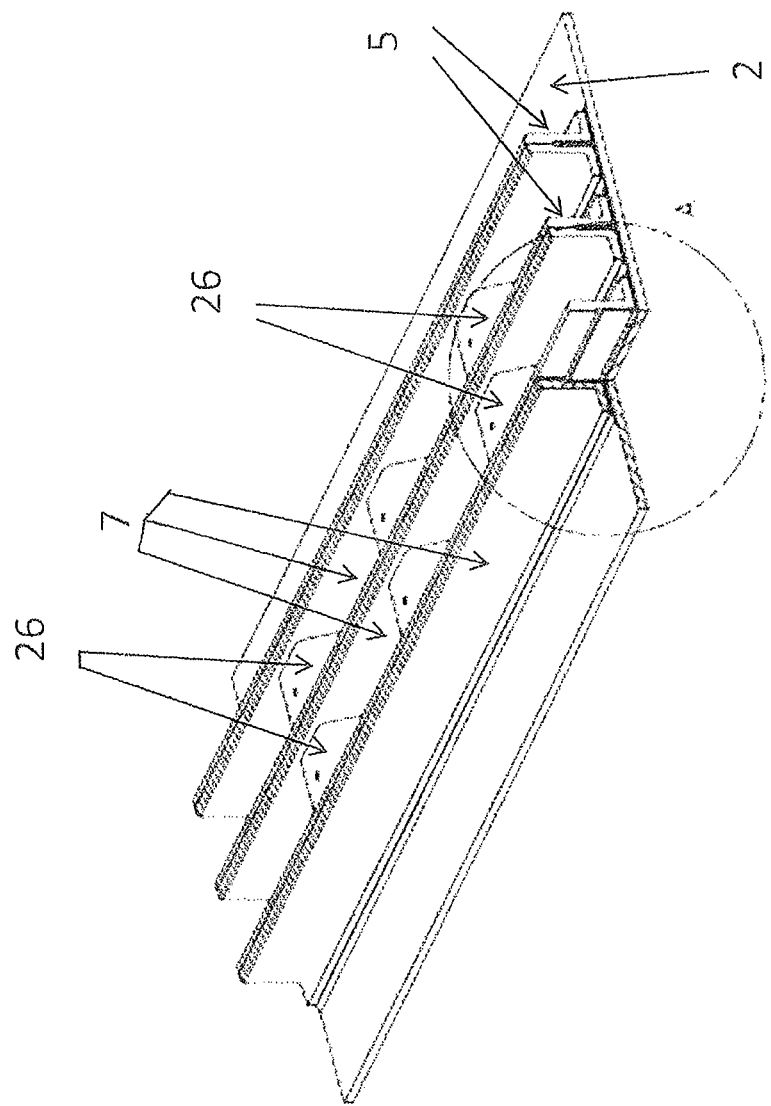
FIG. 6 shows a diagrammatic view of the tool arrangement sectioned in the region of a suction channel of a molding tool with a fiber composite component accommodated therein, wherein adjacent molding tools are spaced by spacer blocks which comprise a resin supply channel connectable to the resin supply line.

As is apparent from FIG. 6, a corresponding number of molding tools 7 are provided for pressing a plurality of stiffening sections 5 (FIG. 6, e.g., shows three stiffening sections 5), which are arranged on the carrier mold 2. Spacer blocks 26 are arranged between the molding tools 7, which spacer blocks fix the molding tools 7 in their intended positions. Moreover, the molding tools 7 comprise adjusting means, e.g. screws or clamps, so as to press the stiffening section 5 accommodated therein to the desired nominal measure.

Figure 7:
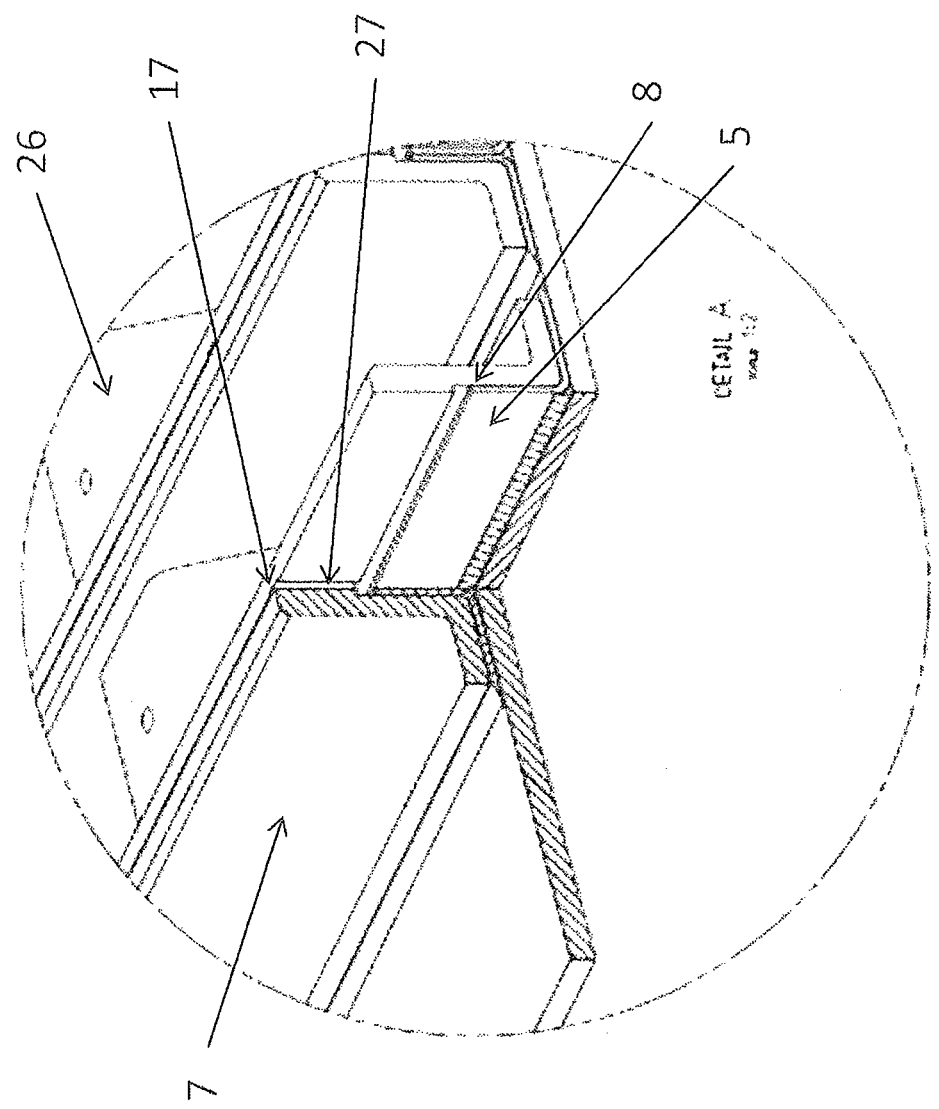
FIG. 7 shows detail A framed by a circle in FIG. 6 on a scale enlarged relative to the former.

As can be seen from the detail view according to FIG. 7, the suction channel 16 is designed as an integral cavity of the molding tool 7. In the exemplary embodiment illustrated, the suction channel 16 extends substantially perpendicular to the longitudinal plane of the fiber lay-up 3. Via an entry opening 27, the suction channel 16 follows upon the region of the recess 8 that remains free above the stiffening section 5 towards the facing inner side of the molding tool 7; thus, a longitudinally extending channel is formed above the section web of the stiffening section 5. The suction channel 16 may, e.g., have a circular, oval or rectangular cross-sectional geometry.

Figure 8:
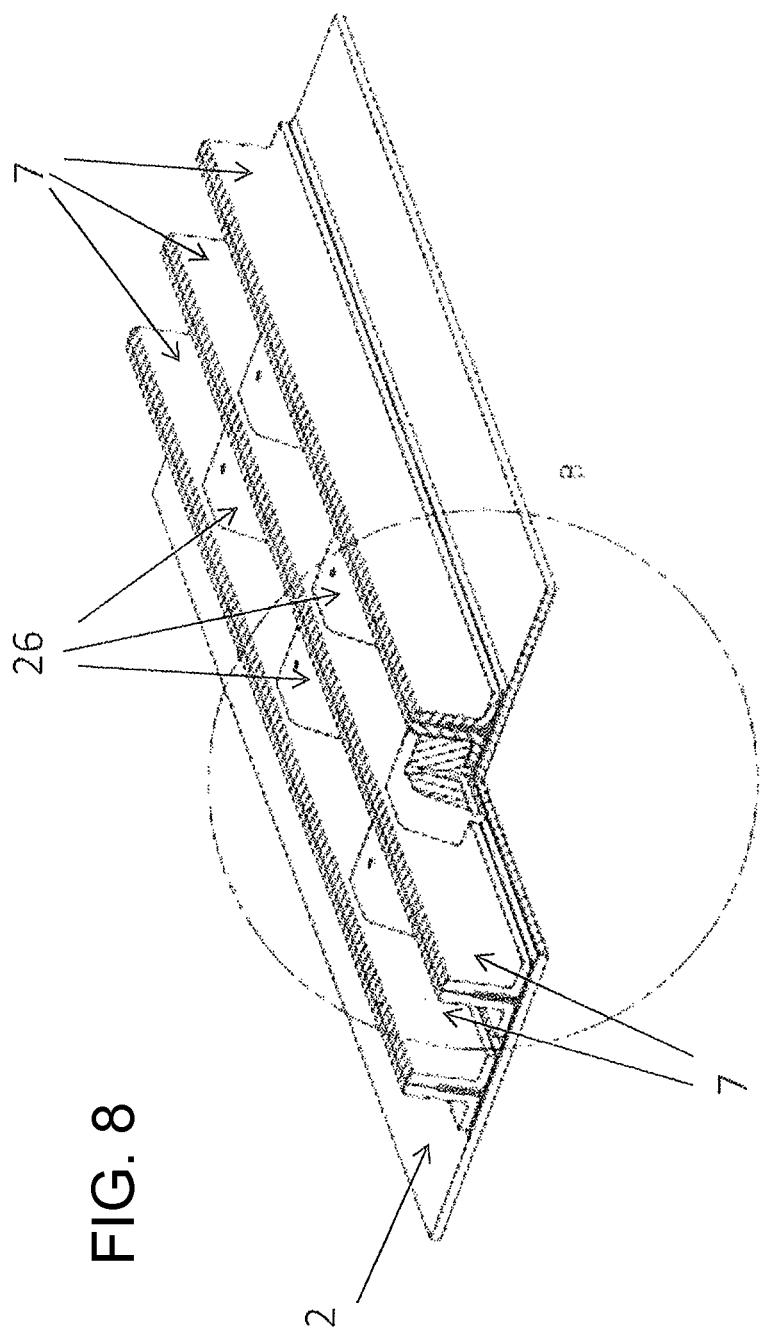
FIG. 8 shows a diagrammatic view of the tool arrangement according to FIG. 6 with a section in the region of the resin supply channel of a spacer block.
Figure 9:
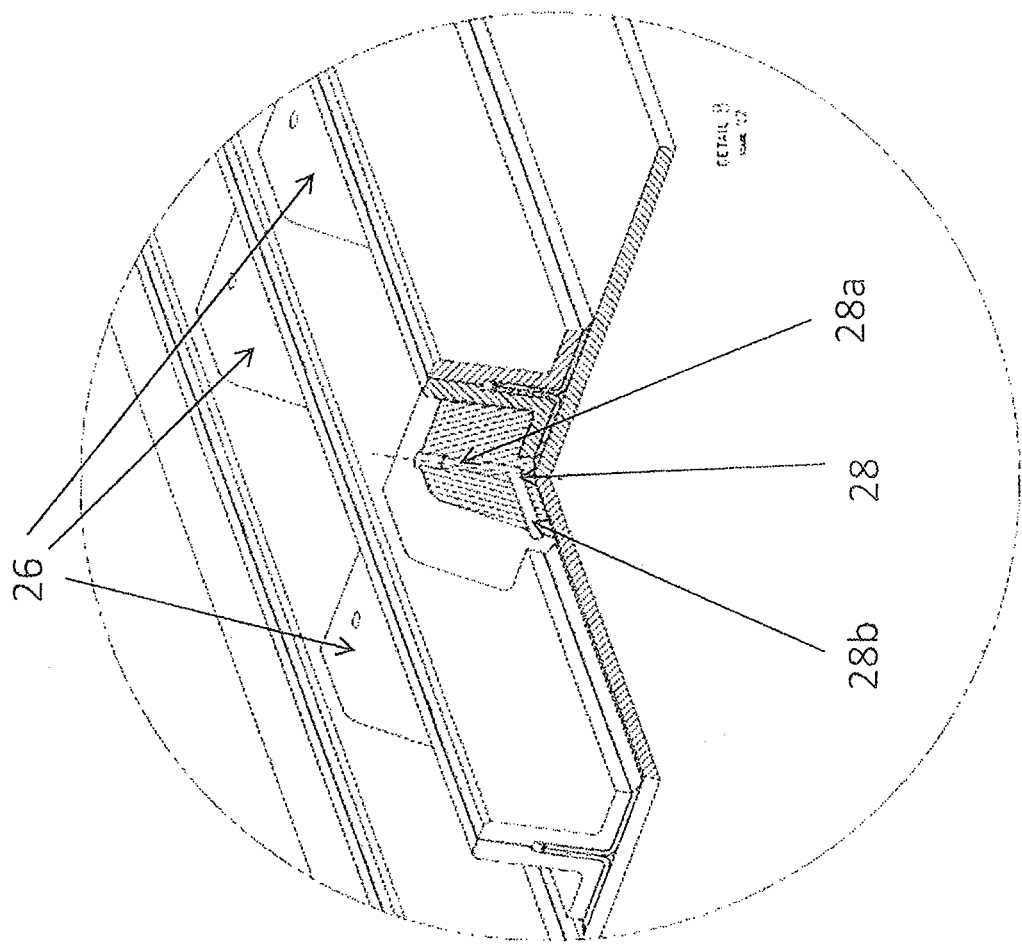
FIG. 9 shows detail B framed by a circle in FIG. 8 on a scale enlarged relative to the former.

In FIGS. 8 and 9, the tool arrangement each is shown with a section in the region of the spacer block 26. Accordingly, the spacer block 26 comprises a central resin supply channel 28 which will be connected to the resin supply line 12. The resin supply channel 28 has a portion 28a extending substantially perpendicular to the longitudinal plane of the fiber lay-up 3, which portion 28a will be connected to the resin supply line 12, and a portion 28b extending substantially in parallel to the longitudinal plane of the fiber lay-up 3, which portion 28b runs into the chamber 10 in the region of the fiber lay-up 3. Accordingly, the resin may advantageously be introduced substantially tangentially to the longitudinal plane of the fiber lay-up 3.

Figure 10:
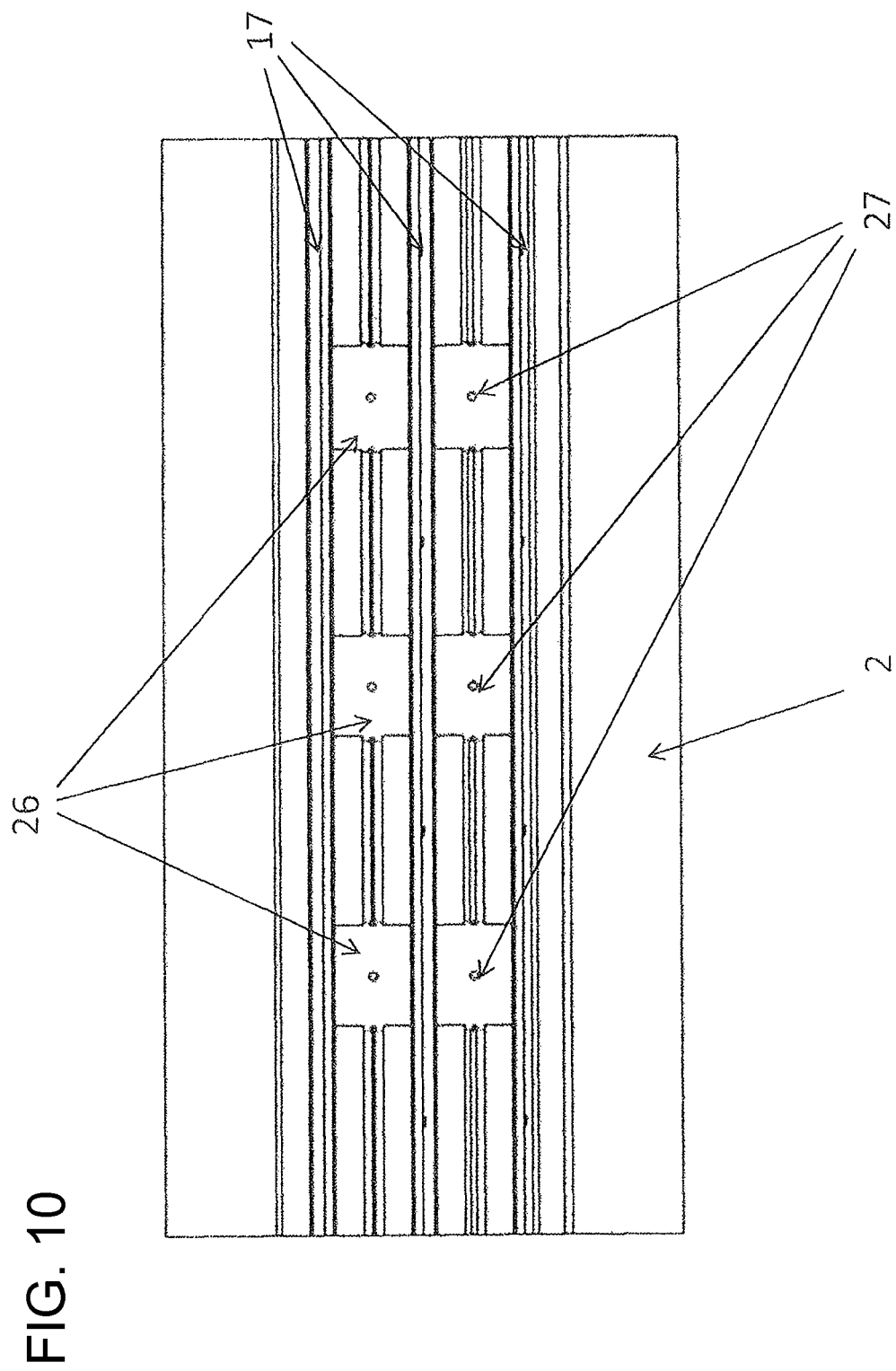
FIG. 10 shows a top view onto the tool arrangement according to FIGS. 6 to 9.
Figure 11:
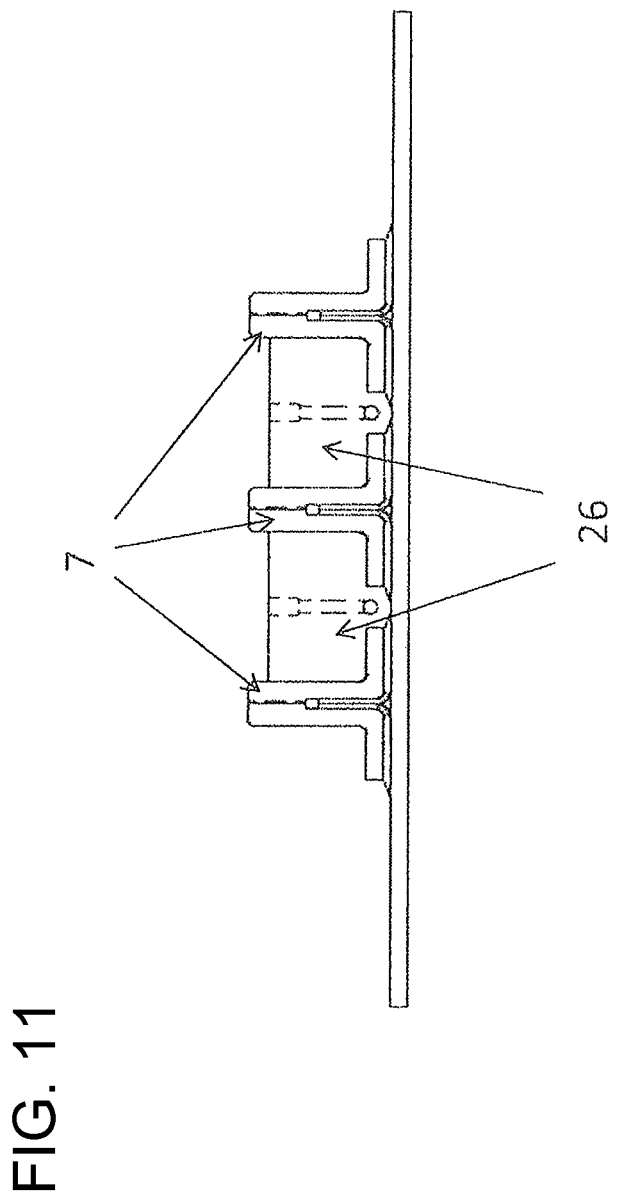
FIG. 11 shows a front elevation of the tool arrangement according to FIGS. 6 to 10.

As can be seen from the top view according to FIG. 10, the sucking off of air is effected via several suction openings 17 spaced in the longitudinal direction of the molding tool 7, which suction openings each end in the connecting part 22 (not shown in FIG. 10), to which at least one vacuum line 15 will be connected. As mentioned, the resin supply is effected at several spacer blocks 26 which are distributed over the length of the molding tools 7 at certain intervals.

The previously described method using the tool arrangement adapted for it my be used with various matrix materials and resins, respectively, which differ particularly in their viscosities and in their temperature parameters. For this, on the one hand matrix materials curing a room temperature or, alternatively, hot curing materials are suitable which in each case are available in different types. In the case of room temperature resins, infusion and subsequent curing will take place at room temperature. For hot curing materials, the typical infusion temperatures will range between e.g. 80° C. to 120° C., and the curing temperatures will be in the range of approximately 180° C. A suitable vacuum pressure for all temperature ranges will be at approximately 20 mbar, wherein a pressure drop during shutdown of the vacuum machine at a level of approximately 20 mbar per 10 min is allowed as tolerance for the quality of the vacuum. At the onset of the process, the entire structure may be subjected to a vacuum test. When applying the vacuum, the throttle function of the membrane filter 19, 19' is observed, which causes the balance between the vacuum pressure in front of and behind the membrane filter 19, 19' to adjust only after a certain time. Subsequently, the vacuum test can be started which should comply with the tolerances indicated above.

In case of a hot-curing resin, the tool arrangement together with the pre-form of the fiber composite component 1 arranged therein will be heated to an infusion temperature of 100° C., e.g.

For this purpose, the entire structure will be placed into a furnace. The resin provided for the infusion will be separately brought to infusion temperature. Advantageously, the temperature of the resin will be somewhat below the temperature of the tool arrangement so as to obtain an improved flow behavior. When the necessary set parameters (temperature, vacuum pressure) have been reached, the infusion process will start.

Figure 12:
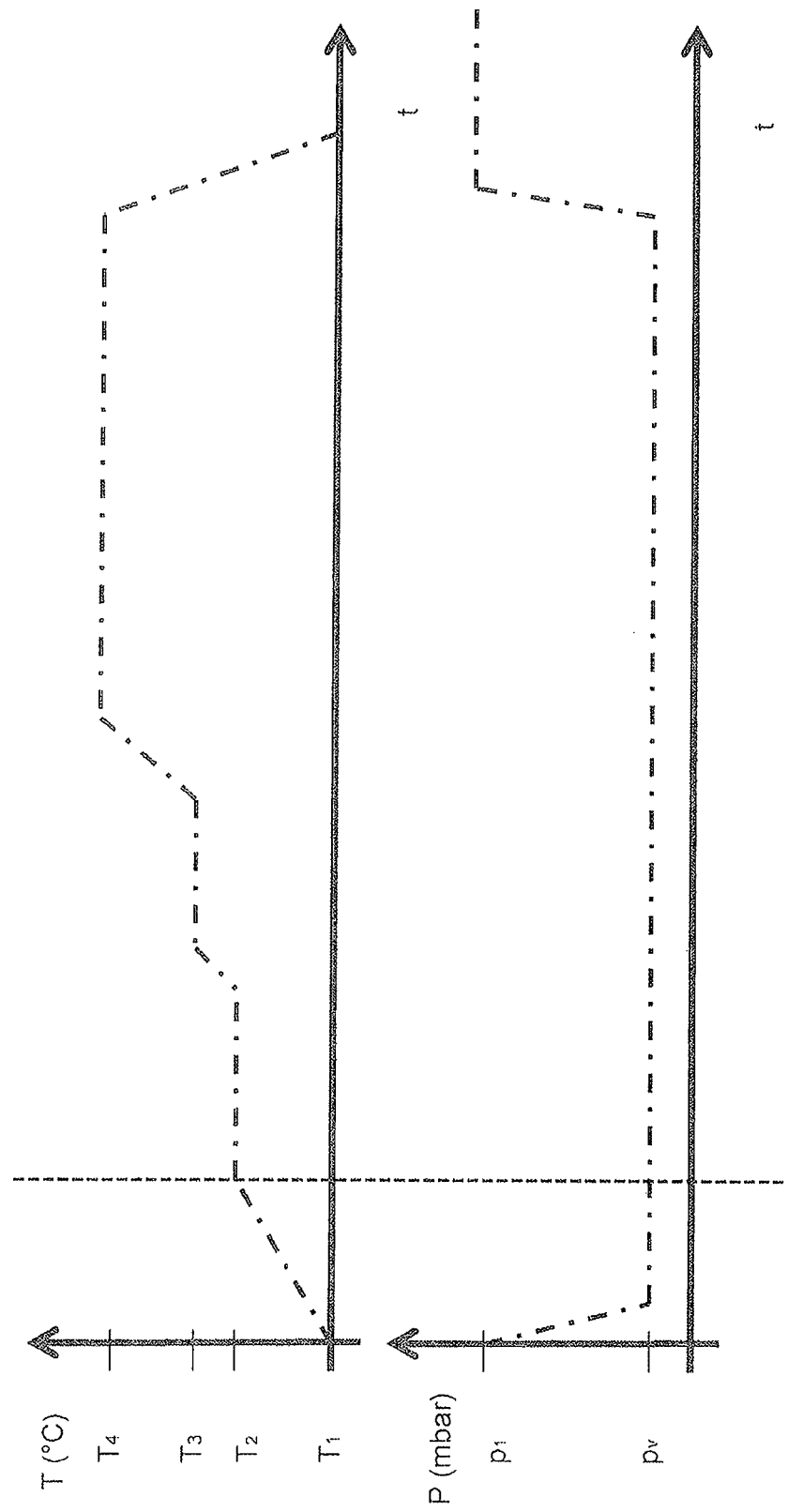
FIG. 12 shows a schematic diagram of the temperature course (top) and the pressure course (bottom), respectively, during the production of the fiber composite component.

In FIG. 12, a typical temperature (top) and pressure course (bottom) during the infusion process when using a hot-curing resin are illustrated. Therein, T1 designates the room temperature, T2 the infusion temperature, T3 an optional maintenance step and T4 the curing temperature. In the corresponding pressure diagram, p1 designates the ambient pressure and pv the infusion pressure. The vacuum will be turned on at least until the expiration of the time of the curing temperature T4, when the matrix becomes less viscous and chemical curing starts.

The invention claimed is:

1. A method for producing a fiber composite component, the method comprising the following steps:
   placing a planar fiber lay-up on a carrier mold;
   providing a side of the fiber lay-up facing away from the carrier mold with at least one stiffening section protruding from a longitudinal plane of the fiber lay-up;
   pressing the fiber lay-up between corresponding tool parts of a molding tool;
   forming a chamber sealed from the carrier mold using an air-tight film enclosing the molding tool, the fiber lay-up and the at least one stiffening section;
   connecting the chamber to at least one resin supply line and at least one vacuum line;
   aspirating resin by applying a negative pressure to the at least one vacuum line and impregnating the fiber lay-up and the stiffening section with resin to form the fiber composite component;
   aspirating air and resin between the tool parts of the molding tool through the at least one stiffening section into a suction channel extending in the molding tool;
   connecting the suction channel to the at least one vacuum line through a suction opening of the molding tool in an air-conducting and resin-conducting manner; and
   providing the vacuum line with a membrane filter being air-permeable and resin-impermeable in a dry state and configured to change over into a substantially air-tight state when impregnated with resin.

2. The method according to claim 1, which further comprises providing the molding tool with a portion free from a membrane or film structure in vicinity of the at least one stiffening section.

3. The method according to claim 1, which further comprises providing the molding tool with a portion free from a semi-permeable membrane in vicinity of the at least one stiffening section.

4. The method according to claim 1, which further comprises suctioning-off resin and air through the suction opening at an upper side of the molding tool facing away from the carrier mold.

5. The method according to claim 1, which further comprises suctioning-off air and resin substantially perpendicularly to the longitudinal plane of the fiber lay-up, at least within portions of the suction channel.

6. The method according to claim 1, which further comprises providing at least one further vacuum line.

7. The method according to claim 6, which further comprises providing the at least one further vacuum line in an edge region of the fiber lay-up.

8. The method according to claim 7, which further comprises uniting the at least one further vacuum line disposed in the edge region of the fiber lay-up with the vacuum line leading from the suction channel in the molding tool, into a common main line.

9. The method according to claim 1, which further comprises providing a membrane or a tissue structure having at least one of a distributing membrane or a peel-ply in a region free from the molding tool.

10. The method according to claim 9, wherein the region free from the molding tool is an edge region of the fiber composite component.

11. The method according to claim 9, which further comprises sealing the distributing membrane relative to the carrier mold in an edge region of the fiber lay-up.

12. The method according to claim 1, which further comprises aspirating the resin in a furnace under a supply of heat.

13. The method according to claim 1, wherein the molding tool has a closed state and a recess with a substantially rectangular cross-section in the closed state for pressing a web-shaped part of the stiffening section.

14. The method according to claim 1, wherein the molding tool has a closed state and a recess with a substantially L-shaped cross-section in the closed state for pressing a correspondingly shaped part of the stiffening section.

15. The method according to claim 1, which further comprises providing the molding tool as one of at least two molding tools each configured to press a respective stiffening section, placing at least one spacer block between the stiffening sections, and providing the at least one spacer block with a resin supply channel to be connected to the resin supply line.

16. The method according to claim 15, which further comprises providing the resin supply channel of the at least one spacer block with a portion extending substantially perpendicular to the longitudinal plane of the fiber lay-up and configured to be connected to the resin supply-line, and a portion extending substantially parallel to the longitudinal plane of the fiber-lay-up and configured to introduce resin.

* * * * *